United States Patent Office 3,639,624
Patented Feb. 1, 1972

3,639,624
PHARMACEUTICAL COMPOSITIONS AND
METHODS OF TREATMENT
Tsung-Ying Shen, Westfield, William V. Ruyle, Scotch
Plains, and Bruce E. Witzel and Gordon L. Walford,
Westfield, N.J., assignors to Merck & Co., Inc., Rahway, N.J.
No Drawing. Continuation-in-part of application Ser. No.
836,620, June 25, 1969. This application Apr. 20, 1970,
Ser. No. 30,289
Int. Cl. A61k 27/00
U.S. Cl. 424—317
13 Claims

ABSTRACT OF THE DISCLOSURE

This invention relates to new pharmaceutical compositions having as an active ingredient substitute tricyclic carboxylic acids and their derivatives.

These pharmaceutical compositions are useful as anti-inflammatory compounds. Also included are methods of treating inflammation by administering these particular compositions to patients.

CROSS REFERENCE TO RELATED APPLICATIONS

This application is a continuation-in-part of our co-pending U.S. application S.N. 836,620 filed June 25, 1969, now abandoned.

BACKGROUND OF THE INVENTION

The development of anti-inflammatory compounds in the past two decades has seen the growth of a great many new drugs. Most of these have been steroids of the 11-oxygenated pregnane series. These, while highly effective, have the drawback of causing many side effects. There is a need in the market for equally effective compounds of nonsteroidal structure having less side effects.

SUMMARY OF THE INVENTION

This invention relates to new pharmaceutical compositions having as an active ingredient a substituted tricyclic carboxylic acid, and to a method of treating inflammation using these compounds. In addition, some of them have a useful degree of anti-pyretic, analgesic, diuretic, anti-fibrinolytic and hypo-glycemic activity. More specifically, this invention relates to pharmaceutical compositions having as an active ingredient a substituted tricyclic carboxylic acid, ester, amide, anhydride, or non-toxic pharmaceutically acceptable salt thereof. Still more specifically, this invention relates to pharmaceutical compositions having as an active ingredient, a compound of the following general formula:

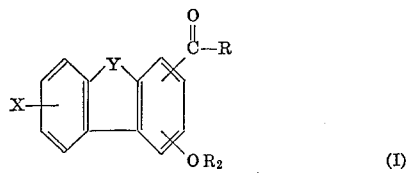

wherein:

R is selected from the group consisting of hydroxy, amino, lower alkoxy (such as methoxy, ethoxy, butoxy, pentoxy, and the like), lower alkylamino (methylamino, propylamino, pentylamino, and the like), di(lower alkyl) amino (dimethylamino, dibutylamino, propylpentylamino, and the like), diloweralkylaminoloweralkylamino, diloweralkylaminoloweralkoxy, hydroxyloweralkoxy, (3-hydroxypropoxy, 2-hydroxypropoxy, 4-hydroxybutoxy and the like), polyhydroxyloweralkoxy (2,3-dihydroxypropoxy, 2,3,4,5,6-pentahydoxyhexyloxy and the like), loweralkoxyloweralkoxy (ethoxyethoxy), arylloweralkoxy (benzyloxy, phenethoxy and the like), phenoxy, substituted phenoxy (such as loweralkoxy-, diloweralkyl-amino- and loweralkanoylaminophenoxy), carboxy and carboloweralkoxy, loweralkanoylaminoloweralkoxy, hydrazino, hydroxylamino, N-morpholino, N-(4-loweralkyl)piperidino, N-(4-hydroxyloweralkyl)piperidino, (hydroxyloweralkyl)amino, and a naturally occurring amino acid radical with attachment at the N, such as glycine, phenylalanine, proline, methionine and taurine;

$R_2$ is hydrogen, acyl (preferably loweracyl such as formyl, acetyl, propionyl, butyryl, etc.), alkyl (preferably loweralkyl such as methyl, ethyl, propyl, isopropyl, butyl, pentyl, etc.) or alkoxy carbonyl (preferably loweralkoxy carbonyl, such as methoxy carbonyl, ethoxy carbonyl, etc.), X is hydrogen, halogen (such as chloro, bromo, fluoro, or iodo, preferably fluoro or chloro), haloalkyl (preferably haloloweralkyl such as trifluoromethyl, etc.), alkoxy (preferably loweralkoxy such as methoxy, ethoxy, isopropoxy, butoxy, etc.), hydroxy, nitro, amino, diloweralkylamino (preferably dimethylamino, dibutylamino, propylpentylamino, etc.), acylamino (preferably loweracylamino such as formylamino, acetylamino, propionylamino, butyrylamino, etc.), mercapto, alkylmercapto (preferably loweralkylmercapto such as methylmercapto, ethylmercapto, etc.), alkylsulfinyl (preferably loweralkylsulfinyl such as methylsulfinyl, ethylsulfinyl, butylsulfinyl, etc.), or alkylsulfonyl (preferably loweralkylsulfonyl such as methylsulfonyl, ethylsulfonyl, butylsulfonyl, etc.), and Y may be carbyl or carbonyl provided that $OR_2$ and

are ortho to each other.

Representative compounds of this invention are as follows:

7-fluoro-2-hydroxyfluorene-1-carboxylic acid;
7-fluoro-2-hydroxyfluorene-3-carboxylic acid;
7-chloro-2-hydroxyfluorene-1-carboxylic acid;
7-chloro-2-hydroxyfluorene-3-carboxylic acid;
7-methoxy-2-hydroxyfluorene-1-carboxylic acid;
6-fluoro-2-hydroxyfluorene-3-carboxylic acid;
6-fluoro-2-hydroxyfluorene-1-carboxylic acid;
7-dimethylamino-2-hydroxyfluorene-3-carboxylic acid;
7-trifluoromethyl-2-hydroxyfluorene-1-carboxylic acid;
7-trifluoromethyl-2-hydroxyfluorene-3-carboxylic acid;
7-fluoro-2-hydroxyfluorenone-1-carboxylic acid; and
7-fluoro-2-hydroxyfluorenone-3-carboxylic acid.

This invention also relates to a method of treating inflammation in patients (animal or human) using a compound of Formula I, particularly an especially preferred compound as the active constituent.

The compounds of the instant invention can be used to treat inflammation by reducing inflammation and relieving pain in such diseases as rheumatoid arthritis, osteoarthritis, gout, infectious arthritis and rheumatic fever.

The compounds of Formula I also have antipyretic, analgesic, diuretic, anti-fibrinolytic and hypoglycemic activity and would be administered and used in the same manner and in the same dosage ranges as if they were being used to treat inflammation as discussed further on.

The treatment of inflammation in accordance with the method of the present invention is accomplished by orally, rectally, parenterally, or topically administering to patients a composition of a compound of Formula I, particularly the especially preferred compounds in a non-toxic pharmaceutically acceptable carrier, preferably in tablet or capsule form.

The non-toxic pharmaceutical carrier may be, for example, either a solid or a liquid. Exemplary of solid carriers are lactose, corn starch, gelatin, talc, sterotix, stearic acid, magnesium stearate, terra alba, sucrose, agar, pectin, Cab-o-sil, and acacia. Exemplary of liquid carriers are peanut oil, olive oil, sesame oil and water. Similarly, the carrier or diluent may include a time delay material such as glyceryl monostearate or glyceryl distearate alone or with a wax.

Several pharmaceutical forms of the therapeutically useful compositions can be used. For example, if a solid carrier is used, the compositions may take the form of tablets, capsules, powders troches or lozenges, prepared by standard pharmaceutical techniques. If a liquid carrier is used, the preparation may be in the form of a soft gelatin capsule, a syrup or a liquid suspension. Suppositories for rectal administration and gels for topical administration maybe prepared in conventional manners.

The active compounds of Formula I and of the compositions of this invention are present in an amount sufficient to treat inflammation, that is to reduce inflammation. Advantageously, the composition will contain the active ingredient, namely, the compounds of Formula I, in an amount of from about 1 mg. to 100 mg. per kg. body weight per day (50 mg. to 7 g. per patient per day), preferably from about 2 mg. to 50 mg./kg. body weight per day (100 mg. to 3 g. per patient per day).

The method of treatment of this invention comprises administering to a patient (animal or human), a compound of Formula I, particularly an especially preferred compound admixed with a non-toxic pharmaceutical carrier such as exemplified above. The compounds of Formula I and particularly the especially preferred compounds will be administered in an amount of from 1 mg. to 100 mg./kg. body weight per day, perferably from about 2 mg. to about 50 mg. per kilogram body weight per day especially from 4 mg. to 20 mg./kg. body weight per day. The most rapid and effective anti-inflammatory effect is obtained from oral administration of a daily dosage of from about 4 to 20 mg./kg./day. It should be understood, however, that although preferred dosage ranges are given, the dose level for any particular patient depends upon the activity of the specific compound employed. Also many other factors that modify the actions of drugs will be taken into account by those skilled in the art in the therapeutic use of medicinal agents, particularly those of Formula I, for example, age, body weight, sex, diet, time of administration, route of administration, rate of exretion, drug combination, reaction sensitivities and severity of the particular disease.

The compounds of this invention may be prepared from the following type starting material:

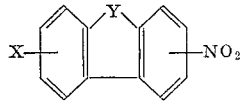

wherein X and Y are as previously defined. The substituted fluorenes and fluorenones are reduced to the corresponding aminofluorenones and fluoreneamines. The reduction may be accomplished in any suitable manner, as for example, by heating a mixture of the appropriately substituted fluorene or fluorenone and a reducing agent such as hydrogen, stannous chloride, zinc dust, Raney nickel, or platinum. If desired, an acidic medium may be used for the reduction.

If a substituted fluorenone is the starting material, its corresponding aminofluorenone may be reduced to the corresponding fluorenamine in any suitable manner.

The substituted fluorenamine is then treated with an alkali metal nitrite in the presence of a strong acid, such as sulfuric acid, hydrochloric acid or phosphoric acid, thereby producing the corresponding fluorenol.

The acid compounds of this invention may be prepared by carboxylating the appropriately substituted fluorenol. This can be accomplished by heating the appropriately substituted fluorenol under pressure with carbon dioxide gas. The product can then be isolated from the reaction mixture by methods known in the art. The temperature at which the carboxylation reaction can take place is from 50° to 300° C. The reaction can also take place at from atmospheric pressure to high pressure, preferably however at 200° C., and at about 1600 p.s.i. pressure.

The compounds of this invention wherein R is a group such that an ester is the final compound (i.e. R is alkoxy) are prepared by any esterification procedure using an esterifying agent containing the appropriate R group. For example, the carboxylic acid compounds of this invention may be reacted with the appropriate lower alkanol (preferably methanol) at elevated temperatures in the presence of a strong acid such as hydrochloric acid, sulfuric acid, p-toluene-sulfonic acid and the like to form the desired ester.

The compounds of this invention wherein R is a group such that an amide is the final compound (i.e. R is amino or substituted amino) may be prepared by any suitable amidation reaction. For example, the carboxylic acid compound (preferably the methyl or ethyl ester) may be reacted with ammonia, ammonium hydroxide, or an amino compound, at any suitable temperature (room temperature to reflux). When the amino group is desired, it is preferred to carry out the reaction with ammonia in a bomb at temperatures above 100° C. to form the desired R (amino) compound. Preferably, when an amide is desired which is derived from an amino acid, the following reaction sequence is followed: The carboxylic acid final compound is reacted with isobutyl chlorocarbonate to form the mixed anhydride. This compound is in turn reacted with the desired amino acid ester and subsequently hydrolyzed to form the desired acid amide.

The salts of the final acid compounds of this invention may be prepared by any of the well-known metathesis procedures. For example, the carboxylic acid compound may be reacted with an inorganic base such as sodium hydroxide, potassium hydroxide, ammonium hydroxide and barium hydroxide and the like. The anhydride of this invention may be prepared by any of the well-known procedures in the art.

If desired, the substituted hydroxyfluorene carboxylic acid may be oxidized to the corresponding hydroxyfluorenone carboxylic acid in any suitable manner.

The following examples are presented to further illustrate the invention:

Example 1A 2-amino-7-fluorofluorenone.—A mixture of 7-fluoro-2-nitrofluorenone (0.04 mole), stannous chloride dihydrate (40.6 g., 0.18 mole), concentrated hydrochloric acid (40 ml.) and ethanol (20 ml.) is heated under reflux with stirring 1 hour.

The mixture is then chilled thoroughly, the amine hydrochloride collected by filtration, and washed with a little cold aqueous ethanol. The free 2-amino-7-fluorofluorenone is liberated by neutralization with aqueous ammonium hydroxide. The amine is collected by filtration, and washed thoroughly with water.

When 2-chloro-5-nitrofluorenone, 4-fluoro-1-methyl-5-nitrofluorenone, 2-benzenesulfonyl-7-nitrofluorenone or 2-p-toluenesulfonyl-7-nitrofluorenone is used in place of 8-bromo-2-nitrofluorenone in the above example, the corresponding aminofluorenone is obtained.

When 2-cyclohexyl-7-nitrofluorene, 6-bromo-2-nitrofluorene, 5-bromo-2-nitrofluorene or 2-methanesulfonyl-5-nitrofluorine is used in place of 8-bromo-2-nitrofluorenone in the above example, the corresponding fluorenamine is obtained.

Example 1B 7-fluoro-2-fluorenamine.—A mixture of 2-amino-7-fluorofluorenone (0.055 mole), red phosphorous (26 g.), 47% hydriodic acid (35 ml.), and glacial acetic acid (300 ml.) is heated under reflux for 40 hours.

The bulk of the solvent is then removed by evaporation in vacuo, and the residue is diluted with water (300 ml.).

The mixture is heated to boiling, filtered hot, and the filtrate neutralized with aqueous ammonium hydroxide. After thorough chilling, the 7-fluoro-2-fluorenamine is collected by filtration and washed well with water.

When 4-amino-7-bromofluorenone, 2-amino-5,7-dichlorofluorenone or any of the aminofluorenones of Example 1A is used in place of 2-amino-8-bromofluorenone in the above example, the corresponding fluorenamine is obtained.

Hydroxyfluorenones, such as 4-hydroxyfluorenone, 6-methyl-2-hydroxyfluorenone and 5,6-dimethyl-2-hydroxyfluorenone, are reduced to the corresponding fluorenols with hydrazine hydrate and potassium hydroxide in diethylene glycol.

Example 1C 7-fluoro-2-fluorenol.—To a stirred, ice-cold solution of 7-fluoro-2-fluorenamine (2.0 g., 0.010 mole) in acetic acid (20 ml.) and water (60 ml.) are added successively concentrated sulfuric acid (2 ml.) and a solution of sodium nitrite (1.0 g., 0.015 mole) in water (10 ml.). The mixture is allowed to warm to room temperature, and then is heated gradually to 80° and held at that temperature until evolution of nitrogen ceases.

The mixture is chilled thoroughly, and 7-fluoro-2-fluorenol is collected by filtration, washed well with cold water, and recrystallized from aqueous alcohol.
When 7-bromo-2-fluorenamine,
7-chloro-2-fluorenamine,
7-iodo-2-fluorenamine,
7-benzyl-2-fluorenamine,
7-p-methylbenzyl-2-fluorenamine,
7-methanesulfonyl-2-fluorenamine,
6-chloro-2-fluorenamine,
6-fluoro-2-fluorenamine,
5-fluoro-2-fluorenamine,
5-nitro-2-fluorenamine,
8-fluoro-2-fluorenamine,
6,7-dichloro-2-fluorenamine,
5,7-difluoro-2-fluorenamine,
6,8-difluoro-2-fluorenamine or any of the fluorenamines of Examples 1A and 1B is used in place of 7-fluoro-2-fluorenamine in the above example, the corresponding fluorenol is obtained.

Example 1D 7-fluoro-2-hydroxyfluorene-1-carboxylic acid and 7-fluoro-2-hydroxyfluorene-3-carboxylic acid.—7 - fluoro-2-fluorenol (10.0 g., 0.05 mole) is dissolved in a solution of potassium hydroxide (2.8 g., 0.05 mole) in water (7.5 ml.) and ethanol (18 ml.); the solution is then evaporated to dryness in vacuo.

The thoroughly-dried potassium salt is mixed intimately with anhydrous potassium carbonate (27 g.), and the mixture is heated for 10 hours at 170° C. with dry carbon dioxide at a pressure of 50 atmospheres.

The mixture is taken up in water (750 ml.), and the resulting solution is acidified with hydrochloric acid and chilled thoroughly. The mixed hydroxy acids, 7-fluoro-2-hydroxyfluorene-1-carboxylic acid and 7-fluoro-2-hydroxyfluorene-3-carboxylic acid, are collected by filtration, washed well with cold water, and separated by fractional crystallization from alcohol.
When 7-amino-2-fluorenol,
7-nitro-2-fluorenol,
7-methoxy-2-fluorenol,
7-acetyl-2-fluorenol,
7-carboxy-2-fluorenol,
7-carbomethoxy-2-fluorenol,
7-carboethoxy-2-fluorenol,
7-methyl-2-fluorenol,
7-ethyl-2-fluorenol,
6-nitro-2-fluorenol,
8-methyl-2-fluorenol,
6-amino-7-methoxy-2-fluorenol,
7-bromo-8-methyl-2-fluorenol,
6,7-dimethyl-2-fluorenol,
7-methoxy-6-nitro-2-fluorenol or any of the 2-fluorenols of Examples 1B and 1C is used in place of 7-fluoro-2-fluorenol in the above example, the corresponding 2-hydroxyfluorene-1- and 3-carboxylic acids are obtained.

When 1-methyl-2-fluorenol or 1,7-dimethyl-2-fluorenol is used in place of 7-fluoro-2-fluorenol in the above example, the corresponding 2-hydroxyfluorene-3-carboxylic acid is obtained.

When 7-amino-3-fluorenol, 7-nitro-3-fluorenol, 6-chloro-9-trifluoromethyl-3-fluorenol, or 6-fluoro-9-trifluoromethyl-3-fluorenol is used in place of 7-fluoro-2-fluorenol in the above example, the corresponding 3-hydroxyfluorene-2-carboxylic acid is obtained.

Example 2

7-fluoro-2-hydroxyfluorenone - 3 - carboxylic acid.—A mixture of 7-fluoro-2-hydroxyfluorene-3-carboxylic acid (2.7 g., 0.011 mole), sodium dichromate (7.5 g., 0.025 mole), and glacial acetic acid (100 ml.) is heated under reflux for 1 hour, and then is poured into water (400 ml.). The resulting precipitate is collected by filtration, and then is dissolved in excess dilute aqueous sodium hydroxide. The solution is filtered and the filtrate acidified with hydrochloric acid. After thorough chilling, 7-fluoro-2-hydroxyfluorenone-3-carboxylic acid is collected by filtration, and washed with cold water.

When the substituted o-hydroxyfluorene carboxylic acids of Example 1D are used in place of 7-fluoro-2-hydroxyfluorene-3-carboxylic acid in the above example, the corresponding substituted o-hydroxyfluorenone carboxylic acids are obtained.

Example 3

Methyl 7-fluoro-2-hydroxyfluorene-3-carboxylate.—To a mixture of 7-fluoro-2-hydroxyfluorene-3-carboxylic acid (0.015 mole) and absolute methanol (6.1 ml., 0.15 mole) is added, slowly with stirring, 0.6 ml. of concentrated sulfuric acid. The mixture is then heated under reflux for 8 hours. The excess methanol is removed by evaporation in vacuo and the residue is treated with stirring with 25 ml. of ice-water. The methyl 7-fluoro-2-hydroxyfluorene-3-carboxylate is collected by filtration, washed thoroughly with cold water and dried. It is purified by recrystallization from aqueous alcohol.

When ethanol, propanol, isopropanol, butanol, isobutanol or benzyl alcohol is used in place of methanol in the procedure described above, the corresponding ester is obtained.

When the o-hydroxyfluorene and o-hydroxyfluorenone carboxylic acids of this invention are used in place of 7-fluoro-2-hydroxyfluorene-3-carboxylic acid, the corresponding esters are obtained.

Example 4

7-fluoro-2-hydroxyfluorene-3-carboxamide.—A mixture of 7-fluoro-2-hydroxyfluorene-3-carboxylic acid (0.003 mole), anhydrous benzene (30 ml.), and thionyl chloride (0.0033 mole) is refluxed for 1½ hours, and then added gradually to a vigorously stirred, ice-cooled solution of ammonium hydroxide (75 ml.). The mixture is allowed to warm to room temperature, the benzene is removed under a stream of nitrogen, and the precipitated 7-fluoro-2-hydroxyfluorene-3-carboxamide is collected and dried.

When aqueous methyl-, dimethyl-, ethyl-, or diethylamine, piperidine, morpholine or pyrrolidine is used in place of ammonia in the above reaction, the corresponding substituted amide is obtained.

When the o-hydroxyfluorene and o-hydroxyfluorenone carboxylic acids of this invention are used in place of 7-fluoro-2-hydroxyfluorene-3-carboxylic acid, the corresponding amides are obtained.

Example 5

7-fluoro-2-methoxyfluorene-3-carboxylic acid.—Methyl 7-fluoro-2-hydroxyfluorene-3-carboxylate (0.010 mole), sodium (230 mg., 0.010 g.-atom) in anhydrous methanol (10 ml.), and methyl iodide (1.6 g., 0.011 mole) are heated together under reflux for several hours. The methanol is removed by evaporation in vacuo, and the residue is treated with 25 ml. of water. The mixture is rendered alkaline with sodium hydroxide to ensure dissolution of unaltered starting material, and then is extracted twice with 25 ml. portions of ether. The combined ethereal extracts are dried over anhydrous magnesium sulfate and evaporated in vacuo to give methyl 7-fluoro-2-methoxyfluorene-3-carboxylate.

The ester is hydrolyzed under reflux by potassium hydroxide (0.7 g., 0.0125 mole) in alcohol (12.5 ml.). The solution is evaporated to dryness in vacuo, and the residue taken up in 25 ml. of water. The aqueous solution is filtered and the filtrate acidified with hydrochloric acid. The precipitated 7-fluoro-2-methoxyfluorene-3-carboxylic acid is collected by filtration and recrystallized from alcohol.

When ethyl iodide, propyl iodide, butyl iodide, t-butyl iodide, vinyl bromide, and benzyl chloride, are used in place of methyl iodide in the procedure described above, the corresponding alkoxy derivative is prepared.

When the o-hydroxyfluorene and o-hydroxyfluorenone carboxylic acid esters of this invention are used in place of methyl 7-fluoro-2-hydroxyfluorene - 3 - carboxylate, the corresponding alkoxy derivatives are obtained.

Example 6

7-fluoro - 2 - acetoxyfluorene-3-carboxylic acid.—To a mixture of 7-fluoro-2-hydroxyfluorene-3-carboxylic acid (0.008 mole) in anhydrous pyridine (3 ml.) is added acetic anhydride (5.6 ml.) and the resultant mixture is heated on the steam cone for 1.5 hours. The mixture is kept free from moisture during this time. On cooling, the mixture is added to a stirred 100 ml. portion of water, the aqueous system extracted with ether, the ether layers washed with 1 N hydrochloric acid, and water, and then dried over anhydrous magnesium sulfate. Concentrating the filtered ether solution yields 7-fluoro-2-acetoxy-fluorene-3-carboxylic acid.

When propionic anhydride, butyric anhydride, isobutyric anhydride, valeric anhydride, benzoic anhydride, and phenylacetic anhydride are used in place of acetic anhydride in the procedure described above, the corresponding acyloxy derivative is obtained.

When the o-hydroxyfluorene and o-hydroxyfluorenone carboxylic acids of this invention are used in place of 7-fluoro-2-hydroxyfluoroene-3-carboxylic acid, the corresponding acyloxy derivatives are obtained.

Example 7

A mixture of 250 parts of 7-fluoro-2-hydroxyfluorene-3-carboxylic acid and 25 parts of lactose is granulated with suitable water, and to this is added 100 parts of corn starch. The mass is passed through a 16 mesh screen. The granules are dried at a temperature below 60° C. The dry granules are passed through a 16 mesh screen, and mixed with 3.8 parts of magnesium stearate. They are then compressed into tablets suitable for oral administration.

The 7-fluoro-2-hydroxyfluorene-3-carboxylic acid may be replaced by any of the substituted o-hydroxyfluorene and o-hydroxyfluorenone carboxylic acids, amides, esters or pharmaceutically acceptable salts of this invention to produce tablets suitable for oral administration as an anti-inflammatory, anti-pyretic and/or analgesic according to the method of this invention.

Example 8

A mixture of 50 parts of 7-trifluoromethyl-2-hydroxyfluorene-3-carboxylic acid, 60 parts of sucrose, 1.0 part of acetyl alcohol polyethylene oxide condensate, 2 parts of polyvinyl pyrolidone, 0.50 part of methyl p-hydroxybenzoate and 100 parts of water is ball milled for several hours. After the incorporation of suitable coloring and flavoring agents, there is obtained an aqueous suspension suitable for oral administration.

Example 9

5 parts of 7-methoxy - 2 - hydroxy-fluorenone-3-carboxylic acid in a finely divided form are mixed with 12 parts of powdered gum acacia, 0.8 part of powdered tragacanth and 0.4 part of elixir of saccharin, and the whole is mixed with 50 parts water and there is thus obtained an emulsion suitable for oral administration.

We claim:
1. A method of treating inflammation which comprises administering to a patient 1 mg. to 100 mg. per kg. body weight per day of a compound of the formula:

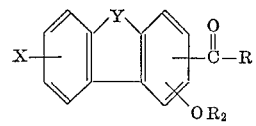

wherein:
Y is carbyl;
X is halogen, loweralkoxy, haloloweralkyl, or diloweralkylamino;
R is hydroxy; and
$R_2$ is hydrogen and lower acyl, provided that the $OR_2$ group is always ortho to the

group or a pharmaceutically non-toxic acid addition salt thereof.

2. A method of treatment according to claim 1 wherein the compound administered is 7-fluoro-2-hydroxyfluorene-1-carboxylic acid.

3. A method of treatment according to claim 1 wherein the compound administered is 7-fluoro-2-hydroxyfluorene-3-carboxylic acid.

4. A method of treatment according to claim 1 wherein the compound administered is 7-chloro-2-hydroxyfluorene-1-carboxylic acid.

5. A method of treatment according to claim 1 wherein the compound administered is 7-chloro-2-hydroxyfluorene-3-carboxylic acid.

6. A method of treatment according to claim 1 wherein the compound administered is 7-methoxy-2-hydroxyfluorene-1-carboxylic acid.

7. A method of treatment according to claim 1 wherein the compound administered is 7-fluoro-2-hydroxyfluorene-3-carboxylic acid.

8. A method of treatment according to claim 1 wherein the compound administered is 6-fluoro-2-hydroxyfluorene-1-carboxylic acid.

9. A method of treatment according to claim 1 wherein the compound administered is 7-dimethylamino-2-hydroxyfluorene-3-carboxylic acid.

10. A method of treatment according to claim 1 wherein the compound administered is 7-trifluoromethyl-2-hydroxyfluorene-1-carboxylic acid.

11. A method of treatment according to claim 1 wherein the compound administered is 7-trifluoromethyl-2-hydroxyfluorene-3-carboxylic acid.

12. A method of treatment according to claim 1 wherein the compound administered is 7 - fluoro-2-hydroxy-fluorenone-1-carboxylic acid.

13. A method of treatment according to claim 1 wherein the compound administered is 7 - fluoro-2-hydroxy-fluorenone-3-carboxylic acid.

References Cited

UNITED STATES PATENTS

| | | | |
|---|---|---|---|
| 1,999,341 | 4/1935 | Muth | 260—315 |
| 2,050,958 | 8/1936 | Muth | 260—346.2 M |
| 2,193,677 | 3/1940 | Muth | 260—520 |

OTHER REFERENCES

Chem. Abst., 33 (5416[2]) (1939).

STANLEY J. FRIEDMAN, Primary Examiner

U.S. Cl. X.R.

424—311; 260—520